United States Patent [19]
Antoun

[11] Patent Number: 5,951,216
[45] Date of Patent: Sep. 14, 1999

[54] PROGRAMMABLE, VARIABLE VOLUME AND PRESSURE, COOLANT SYSTEM

[76] Inventor: Gregory S. Antoun, 25 W. High St., Union City, Pa. 16438

[21] Appl. No.: 08/934,057

[22] Filed: Sep. 19, 1997

[51] Int. Cl.⁶ .................................................... B23B 51/06
[52] U.S. Cl. .................................. 408/56; 405/8; 405/61; 409/136
[58] Field of Search .................................... 408/8, 56, 61; 409/136

[56] References Cited

U.S. PATENT DOCUMENTS

| | | | |
|---|---|---|---|
| 3,893,355 | 7/1975 | Maastricht | 408/60 |
| 4,076,442 | 2/1978 | Cox, Jr. et al. | 408/8 |
| 4,322,992 | 4/1982 | Remillard et al. | 408/56 |
| 5,028,176 | 7/1991 | Delventhal et al. | |
| 5,297,657 | 3/1994 | McConkey | 408/61 |
| 5,522,707 | 6/1996 | Potter | 417/4 |
| 5,559,713 | 9/1996 | Brown et al. | |
| 5,601,414 | 2/1997 | DiRe | |

FOREIGN PATENT DOCUMENTS 2 010 137  6/1979  United Kingdom .

*Primary Examiner*—Andrea L. Pitts
*Assistant Examiner*—Monica Smith
*Attorney, Agent, or Firm*—Richard C. Litman

[57] ABSTRACT

A programmable, variable volume and pressure, coolant system regulating the amount of coolant flow to a cutting tool by controlling the speed of a coolant pump, and is comprised of a fluid control unit and an electrical control panel. The fluid control unit includes a pump and a AC pump motor operatively connected thereto. The electrical control panel includes: a power supply; circuit breakers; a computer; a variable frequency drive; control relays; and a junction block for making electrical connections to the control panel. The computer receives signals from the tool and a pressure transducer, and is programmed with information concerning the total flow area of the coolant orifices. Using this information, the computer determines an ideal pump speed, and sends a control signal to the variable frequency drive which in turn determines the pump motor speed. The coolant supply system also includes: a coolant supply line for routing coolant from the pump to the tool; a catch pan for collecting recycled coolant from the tool; a filter for removing impurities from the used coolant; a reservoir for storing coolant; and a return line for routing the recycled coolant to the reservoir and from the reservoir to the pump inlet.

14 Claims, 5 Drawing Sheets

PROGRAMMABLE, VARIABLE VOLUME AND PRESSURE, COOLANT SYSTEM

BACKGROUND OF THE INVENTION

1. Field of the Invention

The present invention relates to a system for varying the volume and pressure of a coolant produced within machining and cutting tools and, more specifically, to a control system that regulates the speed of a coolant pump based on sensed coolant pressure, and the size of a coolant delivery orifice.

2. Description of the Related Art

Many types of cutting tools require that coolant (and/or lubricant) be delivered directly to the surface being cut. These fluid cooled tools include but are not limited to: drill presses; end mills; routers; and milling cutters. In prior art devices pressurized coolant is supplied by a single speed pump, and pressure control (required due to varying coolant flow requirements during machine processes) is accomplished using pressure relief valves and/or excess coolant is simply allowed to flow through the tool, filter and return lines. These pressure control methods result in reduced filter and pump life, increased heat and foam, and higher energy costs. By controlling the pump motor speed, the present invention overcomes these drawbacks. U.S. Pat. No. 5,028,176, issued on Jul. 2, 1991 to Delventhal et al., discloses a glass drilling machine having a pressure transducer for monitoring cooling fluid back pressure and a regulator for controlling the position of a drill bit based on this back pressure. U.S. Pat. No. 5,559,713 issued on Sep. 24, 1996 to Brown et al., discloses a chip buildup detection and control system, including a computer, for monitoring coolant flow to the cutter of a machine tool and controlling the machining operation and coolant flow. A flow transducer is used to control coolant flow from a high pressure pump. U.S. Pat. No. 5,601,414, issued on Feb. 11, 1997 to DiRe, discloses a programmable logic controller that monitors a fluid pressure and controls a pump motor to regulate pressure within the pump, under abnormal fluctuations. The use of this device to control coolant flow, is not disclosed. British Patent Application No. 2,010,137 (Martin), published on Jun. 27, 1979, discloses a machine tool coolant distribution system that delivers coolant only to those tools in the working position. Control of the pump motor speed is not discussed.

None of the above inventions and patents, taken either singularly or in combination, is seen to describe the instant invention as claimed. Thus a programmable, variable volume and pressure, coolant system solving the aforementioned problems is desired.

SUMMARY OF THE INVENTION

The present invention is directed toward a more efficient method of regulating the amount of coolant flow to a cutting tool in order to compensate for variations in coolant flow requirements. These variations are caused by orifices that may be valved closed, the position of tool relative to surface, etc., machines being on or off, temperature, etc. The coolant flow is regulated in the present invention, by controlling the speed of a coolant pump. The programmable, variable volume and pressure, coolant supply system is comprised of a fluid control unit and an electrical control panel. The fluid control unit includes a pump and a AC pump motor operatively connected thereto. The electrical control panel includes: a power supply; circuit breakers; a computer; a variable frequency drive; control relays; and a junction block for making electrical connections to the control panel.

The computer receives signals from the tool and a pressure transducer, and is programmed with information concerning the total flow area of the coolant orifice(s). Using the programmed information, the pressure signal, and any monitoring signals provided by the tool (which orifices may be valved closed, position of tool relative to surface, etc.), the computer determines an ideal pump speed, and sends a control signal to the variable frequency drive. The control signal sets the frequency of the drive, which in turn determines the pump motor speed.

The coolant supply system also includes: a coolant supply line for routing coolant from the pump to the tool; a catch pan for collecting recycled coolant from the tool; a filter for removing impurities from the used coolant; a reservoir for storing coolant, and a return line for routing the recycled coolant to the reservoir and from the reservoir to the pump inlet. In tools that do not recycle coolant, the catch pan, filter and return line from the tool to the reservoir may be eliminated.

The electrical control panel is connected to the tool and the fluid control unit by electrical control wires. The control wires allow the coolant supply system to be programmed at the tool's control panel, and also connect the internal pressure transducer to the electrical panel. The transducer is located in the supply line, preferably close to or in the tool. The control wires also provide the control signals for the pump and other devices in the fluid control unit that are sent by the electrical panel.

The programmable, variable volume and pressure, coolant supply system of the present invention can also be used to supply coolant to more than one fluid cooled tool, with each tool having one or more coolant orifices. In such a case, the computer is provided with each tool's coolant pressure requirements (instantaneous orifice(s) total flow area, machine on or off, temperature, etc.). While the coolant supply system is self correcting, (a difference between the measured and desired coolant pressure, resulting in an increase or decrease of pump motor speed) by providing the computer with each tool's coolant pressure requirements, the computer can anticipate pressure fluctuations and react by adjusting the pump motor speed prior to the fluctuations occurring.

Accordingly, it is a principal object of the invention to regulate coolant flow in a fluid cooled tool by controlling the speed of a coolant pump motor.

It is another object of the invention to minimize coolant and energy losses in a coolant system by pumping only the necessary amount of coolant through the system.

It is a further object of the invention to increase filter and pump life in a coolant supply system.

It is an object of the invention to provide improved elements and arrangements thereof in a programmable, variable volume and pressure, coolant system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
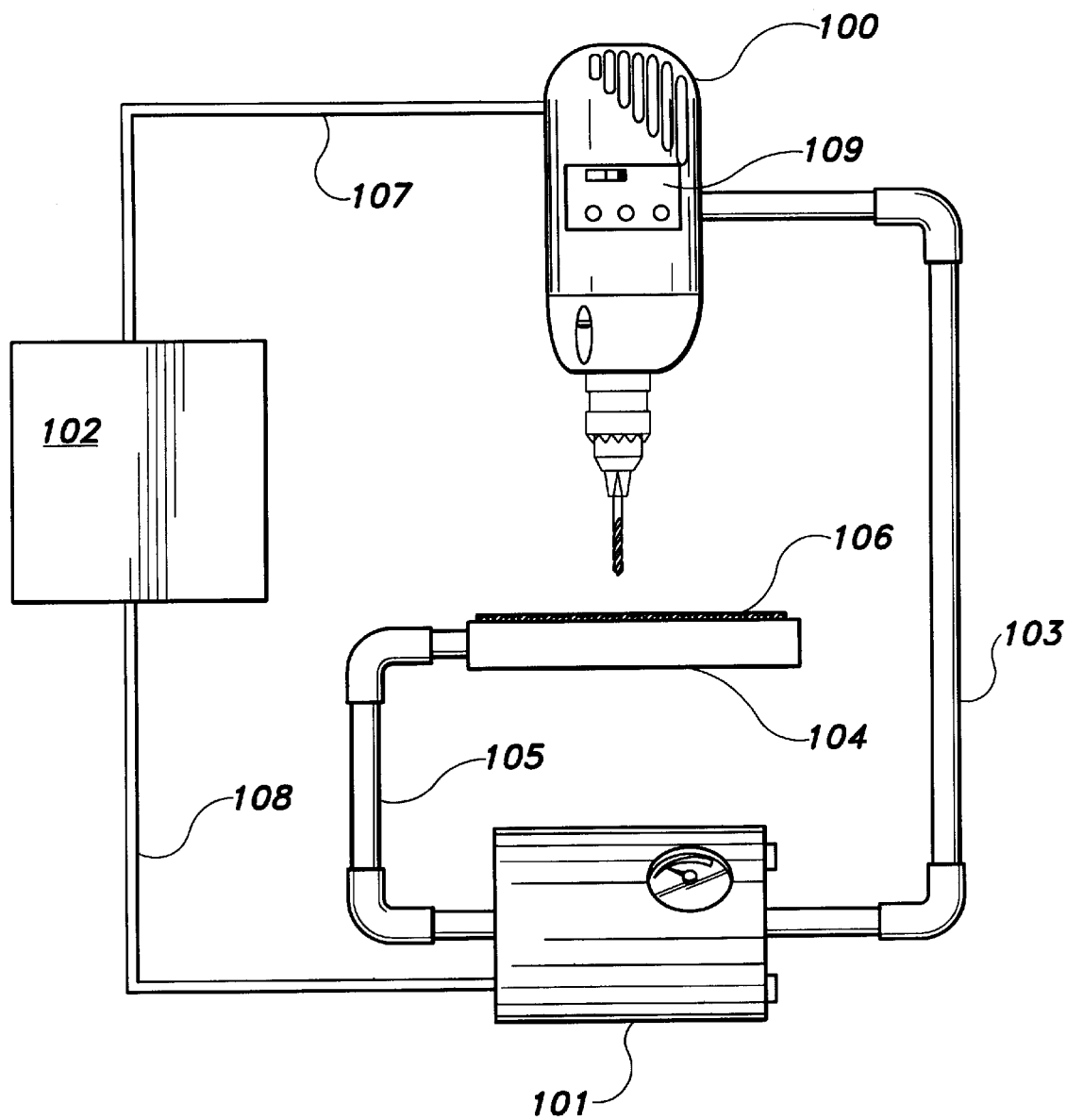
FIG. 1 is an environmental view of the programmable, variable volume and pressure, coolant system of the present invention, connected to a fluid cooled tool.

The present invention is a programmable, variable volume and pressure, coolant supply system. This system is shown supplying coolant to a tool 100 in FIG. 1. The coolant supply system is comprised of two basic components, a fluid control unit 101, and an electrical panel 102. Coolant from the fluid control unit 101 is routed to the tool 100 by a coolant supply line 103. After cooling the tool 100, the coolant is collected by a catch pan 104, and routed back to the fluid control unit 101 by a coolant return line 105. A filter 106 for removing filings from the coolant may be formed integrally with the catch pan 104, or alternatively may be placed in the coolant return line 105. The electrical panel 102 is connected to the tool 100 and the fluid control unit 101, by electrical control wires 107 and 108, respectively. Control wires 107 allow the coolant supply system to be programmed at the tool's control panel 109. If it is desired to monitor coolant pressure directly at the tool, control wires 107 also connect the internal pressure transducer to the electrical panel 102. Control wires 108 provide the control signals for the pump and other devices in the fluid control unit 101 from the electrical panel 102. In addition, when coolant pressure is monitored at the pump's output, control wires 108 also connect the pressure transducer to the electrical panel 102.

Figure 2:
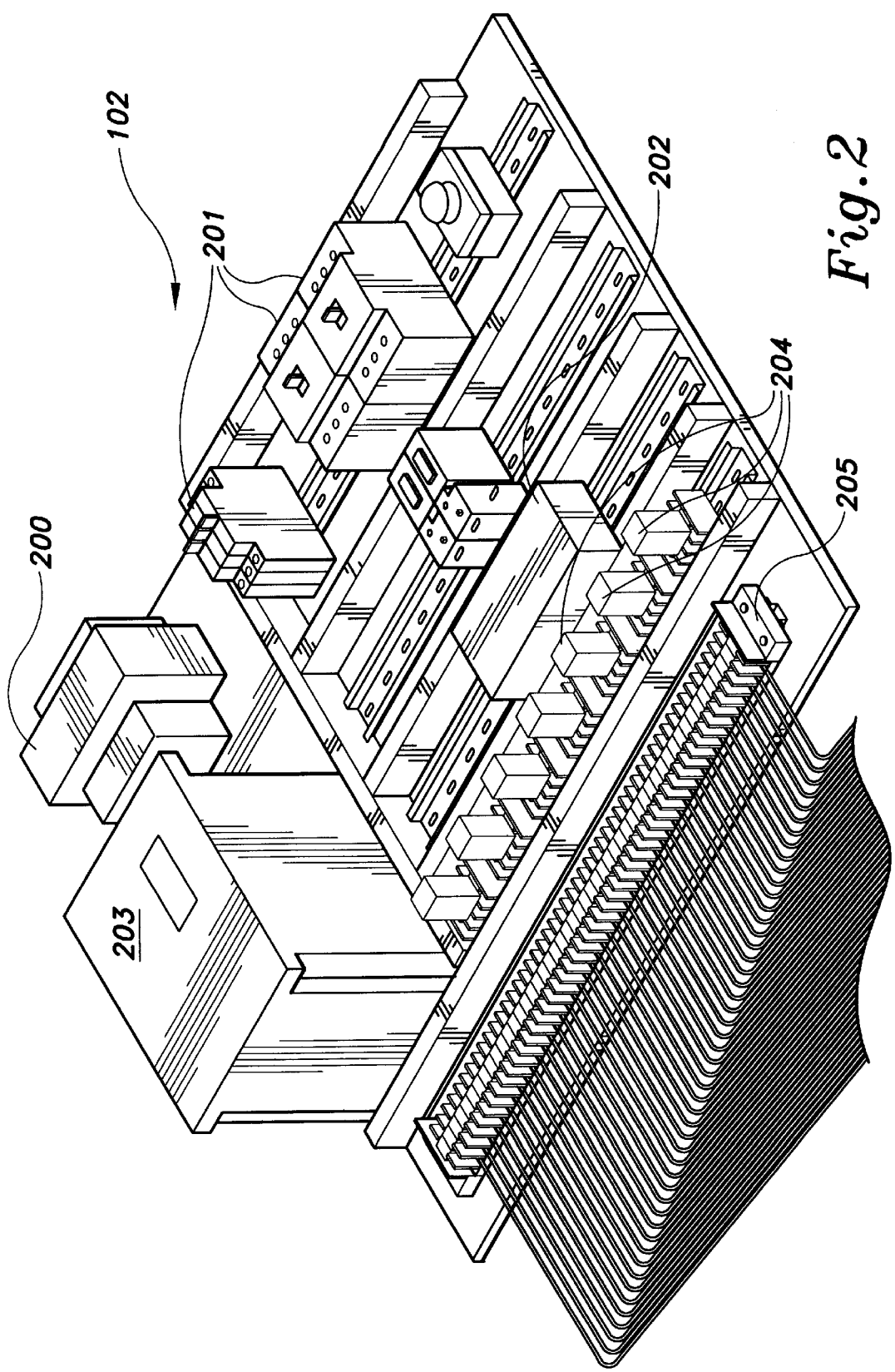
FIG. 2 is a perspective view of the electrical control panel used in the programmable, variable volume and pressure, coolant system of the present invention.

Details of the electrical panel 102 are shown in FIG. 2. The power supply and the power supply transformer 200 provide the necessary operating voltages for the various components of the electrical control system. Circuit breakers 201 protect the electrical panel 102 from excess current flow. Computer 202 receives the signals from the pressure transducer and is programmed with information concerning tool 100. This information includes the number of coolant orifices in the tool 100 and the total flow area of these orifices. Using the programmed information, the pressure signal, and any monitoring signals provided by the tool (which orifices may be valved closed, position of tool relative to surface, etc.) The computer 202 determines an ideal pump speed, and sends control signals to the variable frequency drive 203. The electrical panel 102 also includes a number of control relays 204, and a junction block 205 for connecting electrical control wires 107 and 108 to the electrical panel 102.

Figure 3:
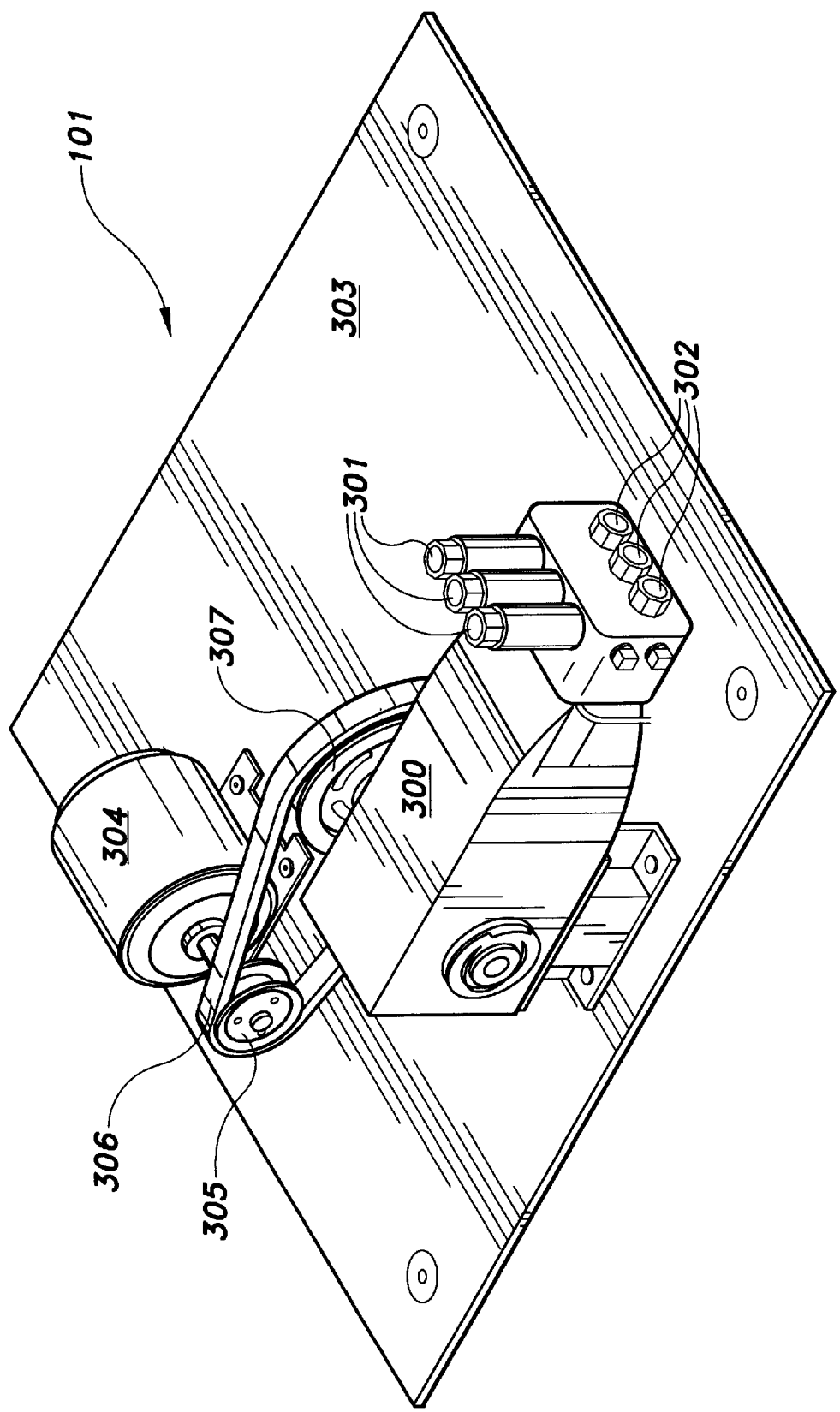
FIG. 3 is a perspective view of the fluid control unit used in the programmable, variable volume and pressure, coolant system of the present invention.

The main components of the fluid control unit 101 are shown in FIG. 3. These include a pump 300 having a number of inlets 301 and a number of outlets 302, and a pump motor 304. The pump motor 304 is an AC synchronous motor and is either single phase or three phase. In AC synchronous motors, the frequency of the AC voltage supplied to the motor determines the speed of the motor. For example a motor that turns at 1714 RPM at 60 Hz will turn at 857 RPM at 30 Hz (neglecting slippage caused by torque and inherent motor characteristics). The motor 304 has a drive shaft with a driving pulley 305 mounted thereon. The driving pulley 305 is operatively connected by drive belt 306 to driven pulley 307 on the input shaft of pump 300. The inherent characteristics of the fluid control unit 101 are programmed into the computer 202. The only critical relationship that the computer needs to be programmed with, however, is the frequency required to drive the pump at a speed that results in the desired coolant pressure. The pump 300, the pump motor 304, and the smaller components (not shown) of the fluid control unit 101, are all mounted to support plate 303. Support plate 303 is mounted using anti-vibration bushings to reduce vibrations transmitted to the tool 100.

Figure 4:
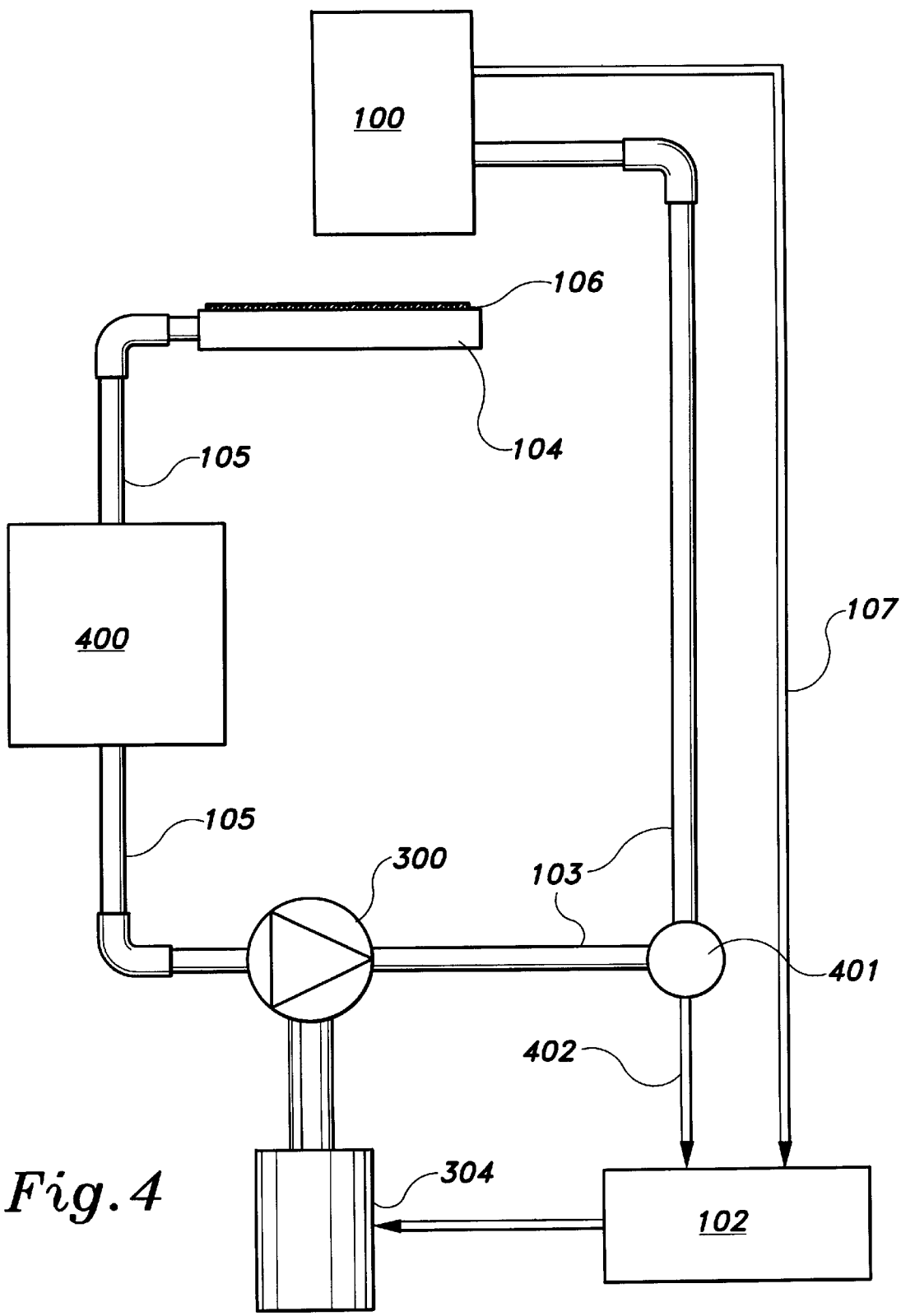
FIG. 4 is a schematic diagram of the coolant system of the present invention.

A schematic representation of the programmable, variable volume and pressure, coolant supply system is shown in FIG. 4. The operation of the coolant supply system is as follows. A coolant reservoir 400, supplies coolant to the inlet of pump 300 via return line 105. Pump 300 is driven by pump motor 304, and delivers pressurized fluid to the fluid cooled tool 100 via supply line 103. A pressure transducer 401 sends a signal proportional to coolant pressure to the computer 202 in the electrical panel 102 via line 402. The transducer 401 can be mounted at any point in the supply line 103, but is preferably mounted in the tool 100 itself. The coolant travels through the cooling orifice(s) in the tool 100 and at least part of the coolant is captured by catch pan 104. As the cutting operation creates filings from the material being machined, a filter 106 is provided to remove any impurities from the coolant. Filter 106 is shown mounted in the catch pan 104, however, it may be mounted at any location between the catch pan 104 and the reservoir 400. Some coolant systems do not recycle the coolant. When the present invention is used with these type systems, the catch pan and return line are eliminated.

Figure 5:
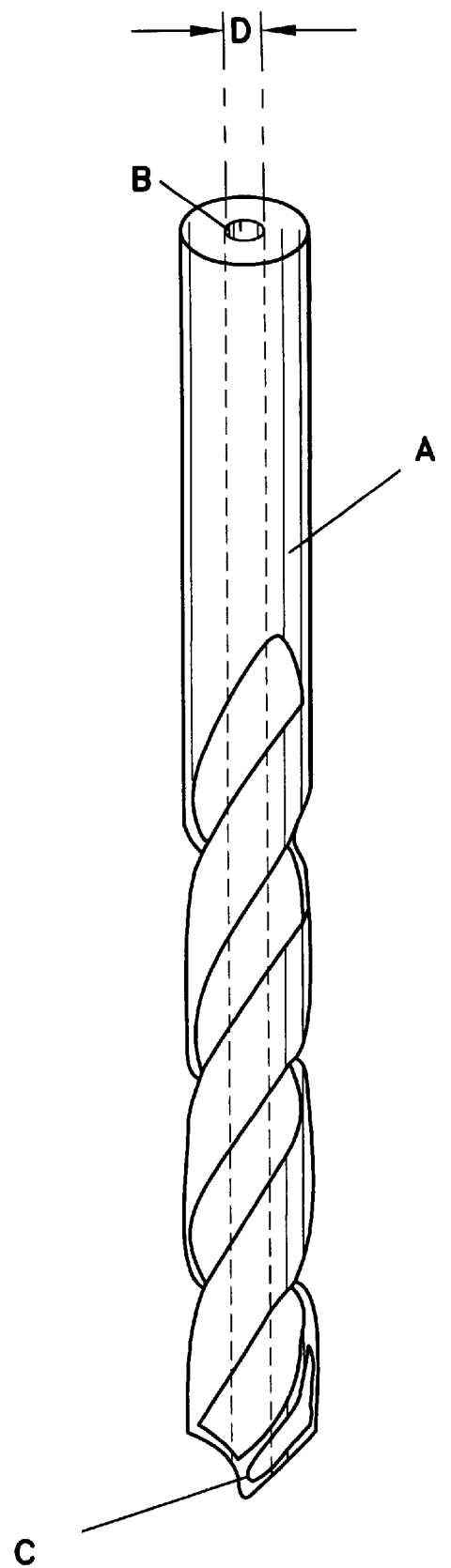
FIG. 5 is a close-up perspective view of a prior art, fluid cooled tool showing a typical coolant orifice therein.

The computer 202 determines a drive frequency based on the flow area of the coolant orifice(s) in the tool 100. In FIG. 5, a typical tool (drill bit) A with a coolant orifice C is shown. Coolant enters the drill bit A at point B, and exits at the coolant orifice C. For a circular orifice having a diameter D, such as the one shown, the flow area, $A_f$ is $D \times \pi$. Coolant flow through the orifice is $(P_t - P_a) \times A_f$. Where $P_t$ is the coolant pressure measured by the transducer, and $P_a$ is atmospheric pressure. Of course, these equations are only shown for background information, and the actual desired pressure is determined by experimentation. As the coolant requirements for the tool 100 change, (due to machining processes, etc.) the desired pressure also changes, and by providing the computer 202 with information concerning these processes, changes in the coolant requirements can be accounted for. Once a desired pressure is determined, the computer 202 provides a signal proportional to a desired associated frequency, to the variable frequency drive 203. The computer 202 can use feedback from the pressure transducer 401 to "hunt" for the desired pressure by increasing and decreasing the frequency and the resulting pump speed.

The programmable, variable volume and pressure, coolant supply system of the present invention can be used to supply coolant to more than one fluid cooled tool, with each tool having one or more coolant orifices. By providing the computer 202 with each tool's coolant pressure requirements (instantaneous orifice(s) total flow area, machine on or off, temperature, etc.) the computer can anticipate pressure fluctuations and react by controlling the pump motor speed.

It is to be understood that the present invention is not limited to the embodiment described above, but encompasses any and all embodiments within the scope of the following claims.

I claim:

1. A programmable, variable volume and pressure, coolant supply system comprising:

at least one fluid pressure transducer for monitoring coolant pressure;

a pump for providing coolant to at least one tool with at least one coolant orifice means, the orifice means having a flow area;

an electrical AC pump motor operatively connected to said pump;

a variable frequency drive electrically connected to said pump motor, said variable frequency drive providing AC power to said pump motor at various frequencies, to thereby control a speed of said pump motor; and a computer, said computer monitoring the coolant pressure via said at least one fluid pressure transducer and being programmed with data related to the flow area of the orifice means; and wherein said computer determines a desired speed of said pump motor based on the coolant pressure and the flow area of the orifice means of the tool;

said computer controlling the variable frequency drive to provide said pump motor with AC power at a frequency that results in said pump motor running at the desired speed.

2. The coolant supply system as defined in claim 1, further comprising a coolant supply line, said coolant supply line extending between said pump outlet and the orifice means, to supply said coolant under pressure to the orifice means.

3. The coolant supply system as defined in claim 2, further comprising a coolant return line, said coolant return line extending between the tool and said pump inlet, for returning said coolant to said pump inlet after said coolant exits the orifice means.

4. The coolant supply system as defined in claim 3, further comprising a coolant reservoir in said coolant return line.

5. The coolant supply system as defined in claim 4, further comprising a coolant catch pan between the tool and said coolant return line, said coolant catch pan receiving said coolant exiting the orifice means and directing it into said coolant return line.

6. The coolant supply system as defined in claim 5, further comprising a coolant filter in said catch pan, to remove impurities from said coolant exiting the orifice means prior to directing said coolant into said coolant return line.

7. A fluid cooled, cutting tool system comprising at least one cutting tool having a coolant orifice means with a flow area for applying a coolant to said at least one tool, and a programmable, variable volume and pressure, coolant supply system, said coolant supply system comprising:

at least one fluid pressure transducer for monitoring the pressure of said coolant;

a pump having an inlet and an outlet, for providing pressurized coolant to said coolant orifice means;

an electrical AC pump motor operatively connected to said pump;

a variable frequency drive electrically connected to said pump motor, said variable frequency drive providing AC power to said pump motor at various frequencies, to thereby control a speed of said pump motor; and a computer, said computer monitoring said coolant pressure via said at least one pressure transducer, and being programmed with data related to said flow area of said coolant orifice means; and wherein said computer determines a desired speed of said pump motor based on said coolant pressure and said flow area of said orifice means;

said computer controlling said variable frequency drive to provide said pump motor with AC power at a frequency that results in said pump motor running at said desired speed.

8. The fluid cooled, cutting tool system as defined in claim 7, wherein:

said coolant orifice means includes a plurality of orifices;

said flow area is a total flow area of said plurality of orifices; and said computer determines said desired speed of said pump motor based on said coolant pressure and said total flow area of the plurality of orifices.

9. The fluid cooled, cutting tool system as defined in claim 8, further comprising a coolant supply line, said coolant supply line extending between said pump outlet and said orifice means, to supply said coolant under pressure to said orifice means.

10. The fluid cooled, cutting tool system as defined in claim 9, further comprising a coolant return line, said coolant return line extending between said at least one tool and said pump inlet, for returning said coolant to said pump inlet after said coolant exits said orifice means.

11. The fluid cooled, cutting tool system as defined in claim 10, further comprising a coolant reservoir in said coolant return line.

12. The fluid cooled, cutting tool system as defined in claim 11, further comprising a coolant catch pan between said at least one tool and said coolant return line, said coolant catch pan receiving said coolant exiting said orifice means and directing it into said coolant return line.

13. The fluid cooled, cutting tool system as defined in claim 12, further comprising a coolant filter in said catch pan, to remove impurities from said coolant exiting said orifice means prior to directing said coolant into said coolant return line.

14. A combination fluid cooled cutting tool and coolant supply system wherein the combination comprises:

a fluid cooled cutting tool comprising:

at least one coolant orifice having a total flow area for applying a coolant to said cutting tool; and a programmable, variable volume and pressure coolant supply system comprising:

at least one fluid pressure transducer for monitoring the pressure of said coolant;

a pump having an inlet and an outlet for providing pressurized coolant to said coolant orifice;

an electrical AC pump motor operatively connected to said pump;

a coolant supply line, said coolant supply line extending between said pump outlet and said coolant orifice, to supply said coolant under pressure to said coolant orifice;

a coolant return line, said coolant return line extending between said cutting tool and said pump inlet, for returning said coolant to said pump inlet after said coolant exits said coolant orifice;

a coolant catch pan located between said cutting tool and said coolant return line, said coolant catch pan receiving said coolant exiting said coolant orifice and directing it into said coolant return line;

a coolant filter in said catch pan, to remove impurities from said coolant exiting said orifice prior to directing said coolant into said coolant return line;

a variable frequency drive electrically connected to said pump motor, said variable frequency drive providing AC power to said pump motor at various frequencies thereby controlling the speed of said pump motor; and a computer programmed with data of said total flow area of said coolant orifice, said computer monitors the coolant pressure by said pressure transducer;

wherein said computer determines a desired speed of said pump motor based on the coolant pressure and the total flow area of said coolant orifice and said computer controls said variable frequency drive to provide said pump motor with AC power at a frequency that results in said pump motor running at said desired speed.

* * * * *

US005951216C1

(12) EX PARTE REEXAMINATION CERTIFICATE (9803rd)
United States Patent
Antoun

(10) Number: US 5,951,216 C1
(45) Certificate Issued: Aug. 16, 2013

(54) PROGRAMMABLE, VARIABLE VOLUME AND PRESSURE, COOLANT SYSTEM

(76) Inventor: Gregory S. Antoun, Union City, PA (US)

Reexamination Request:
No. 90/012,591, Sep. 14, 2012

Reexamination Certificate for:
Patent No.: 5,951,216
Issued: Sep. 14, 1999
Appl. No.: 08/934,057
Filed: Sep. 19, 1997

(51) Int. Cl.
B23Q 11/10 (2006.01)
(52) U.S. Cl.
USPC .................. 408/56; 405/8; 405/61; 409/136
(58) Field of Classification Search
None
See application file for complete search history.

(56) References Cited

To view the complete listing of prior art documents cited during the proceeding for Reexamination Control Number 90/012,591, please refer to the USPTO's public Patent Application Information Retrieval (PAIR) system under the Display References tab.

Primary Examiner — Joseph A. Kaufman

(57) ABSTRACT

A programmable, variable volume and pressure, coolant system regulating the amount of coolant flow to a cutting tool by controlling the speed of a coolant pump, and is comprised of a fluid control unit and an electrical control panel. The fluid control unit includes a pump and a AC pump motor operatively connected thereto. The electrical control panel includes: a power supply; circuit breakers; a computer; a variable frequency drive; control relays; and a junction block for making electrical connections to the control panel. The computer receives signals from the tool and a pressure transducer, and is programmed with information concerning the total flow area of the coolant orifices. Using this information, the computer determines an ideal pump speed, and sends a control signal to the variable frequency drive which in turn determines the pump motor speed. The coolant supply system also includes: a coolant supply line for routing coolant from the pump to the tool; a catch pan for collecting recycled coolant from the tool; a filter for removing impurities from the used coolant; a reservoir for storing coolant; and a return line for routing the recycled coolant to the reservoir and from the reservoir to the pump inlet.

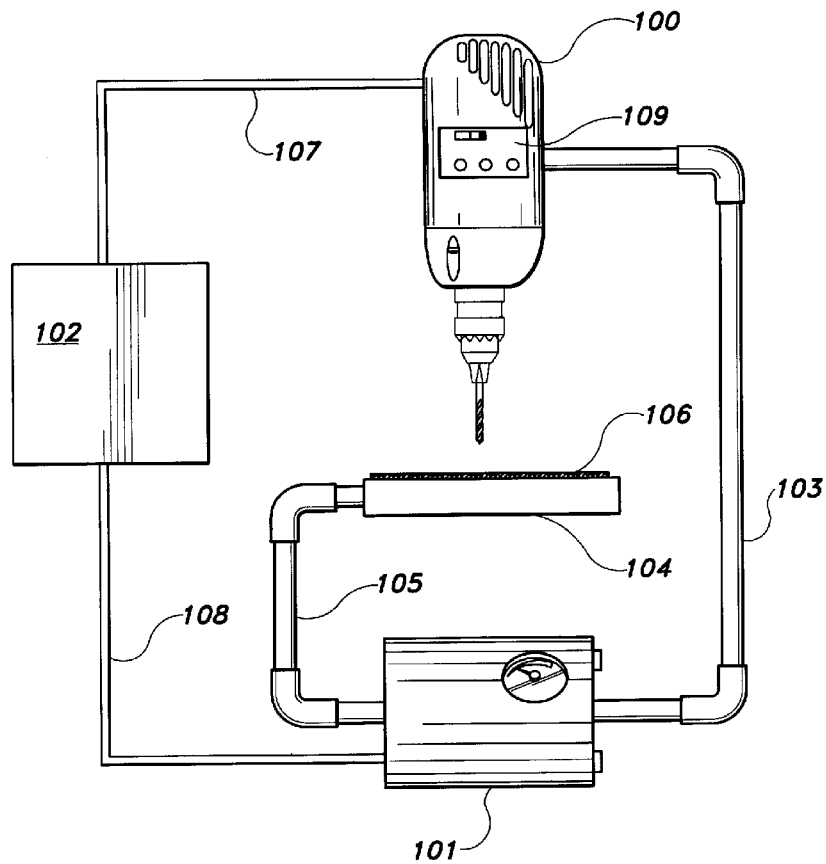

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*